(12) United States Patent
McDonald

(10) Patent No.: US 7,155,105 B2
(45) Date of Patent: Dec. 26, 2006

(54) THERMAL GRADIENT PRISM FOR ACTIVE BEAM STEERING

(75) Inventor: Mark E. McDonald, Milpitas, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/338,930

(22) Filed: Jan. 25, 2006

(65) Prior Publication Data

US 2006/0133761 A1    Jun. 22, 2006

Related U.S. Application Data

(62) Division of application No. 10/745,010, filed on Dec. 23, 2003, now Pat. No. 7,024,091.

(51) Int. Cl.
*G02B 6/00* (2006.01)
*G02B 6/34* (2006.01)

(52) U.S. Cl. .................................. 385/140; 385/36

(58) Field of Classification Search ................ 385/140, 385/36

See application file for complete search history.

(56) References Cited

U.S. PATENT DOCUMENTS 4,762,383 A * 8/1988 Yamashita et al. ............. 385/7
5,347,395 A   9/1994 Lautenschlager et al.
5,956,312 A   9/1999 Ishihara
2002/0001135 A1   1/2002 Berman et al.
2003/0058537 A1   3/2003 Domroese et al.
2004/0120041 A1 * 6/2004 Silverstein et al. .......... 359/486

FOREIGN PATENT DOCUMENTS

SU          443250 A  *  8/1975

* cited by examiner

*Primary Examiner*—Kaveh Kianni
(74) *Attorney, Agent, or Firm*—Marshall, Gerstein & Borun LLP

(57) ABSTRACT

A variable optical attenuator (VOA) for use in an optical fiber communication system has a substrate, a thermal gradient prism and a heating element deposited on the prism. Heat is applied to the thermal gradient prism through the heating element. An optical signal is input into the prism via an optical signal input source. The optical signal traveling through the prism may be deflected due to a thermal gradient of the prism. The deflected optical signal is output into an optical signal output carrying medium. An optical signal strength measuring apparatus may measure a parameter related to the strength of the optical signal output into the optical signal output carrying medium.

7 Claims, 6 Drawing Sheets

THERMAL GRADIENT PRISM FOR ACTIVE BEAM STEERING

CROSS REFERENCE TO RELATED APPLICATIONS

This application is a divisional of U.S. application Ser. No. 10/745,010, filed Dec. 23, 2003 now U.S. Pat. No. 7,024,091 and entitled "Thermal Gradient Prism for Active Beam Steering", (which is hereby expressly incorporated by reference herein).

TECHNICAL FIELD

This patent relates generally to fiber optic communication systems and more particularly to active beam steering devices used in fiber optic communication systems.

BACKGROUND

The need for communication bandwidth capacity has increased dramatically in the last two decades and continues on an exponential growth path. To fill this need communications companies have invested large sums into developing infrastructures to transmit information. One of the various methods of transmitting large quantities of information that has experienced much growth in the last decade utilizes optical fibers and transmits information in the form of modulated optical signals through these fibers. A communication system using optical fiber use transmitters at one end that typically convert electrical signals into optical signals that are transmitted through the fiber and receivers that convert optical signals into electrical signals at the other end of the fiber carrying the optical signal.

At various points throughout a fiber optic communication system, it is necessary to connect two fibers to each other where an optical signal being carried from one fiber is diverted into the other fiber. It is not atypical for an optical signal to travel long distances of up to several hundreds of kilometers on a single fiber. Even though optical signals can travel long distances without major deterioration in the quality of the signal, as a result of chromatic dispersion or other losses, it is necessary to use regenerators or optical amplifiers to restore optical signal quality. The use of such optical amplifiers, regenerators, etc., necessitates interconnections of two or more fibers.

It is important to have accurate alignment of optical signals at various fiber interconnection points. While many fiber to fiber connections can be accomplished with fiber fusion, a significant number of fiber interconnections require routing through free space. It is well known that precise alignment of fibers and other components at interconnection of fibers is a very time consuming and costly task. For example, as currently practiced, packaging of individual optoelectronic components with optic fibers accounts for 40–50 percent of the total product cost of such assembly. The problem is the need to align optoelectronic components and optical fibers with submicron ($<1\times10^{-6}$ m) precision. This submicron or nanometer precision is even more critical for interconnections that target high coupling efficiency.

Apart from the alignment problem discussed above, it is often necessary to adjust the coupling efficiency of an interconnection and various devices are used at the fiber interconnections to achieve the desired level of coupling efficiency between fibers or between a fiber and an opto-electronic device, such as a laser diode, etc. One of the commonly used devices to achieve desired coupling efficiency at interconnection points between two fibers or between a fiber and an opto-electronic device is a variable optical attenuator (VOA). A VOA is a device capable of producing a desired reduction in the strength of an optical signal transmitted through an optical fiber. In modem day communication systems, VOAs are key components of optical networks, including local and long distance telephone networks. High performance telecommunication systems rely on VOAs to perform power equalization after a variety of network functions including filtering, switching, splitting, coupling, and combining.

Generally, VOAs are designed to control signal power levels in optical networks, typically to reduce the power level in optical networks to a desired set point. A VOA may achieve the desired functionality of power reduction by diverting optic energy towards or away from a desired direction. A VOA used at an interconnection of optic fibers may have a desired coupling efficiency of anywhere from essentially zero to one hundred percent depending upon the required reduction of power level. In a special case when a desired coupling efficiency of a VOA is zero, it is known to operate as a shutter, meaning that none of the energy input to the VOA is output to the optical fiber.

VOAs are of two fundamental types, mechanical and non-mechanical. The mechanical VOAs may have moving parts such as stepper motors to adjust an optical filter to vary the attenuation. In non-mechanical VOAs, the mechanism employed to adjust the attenuation may be a magneto-optic effect that modifies a light waveguide (Other non-mechanical VOAs including crystal VOAs are also well known). The attenuation settings of non-mechanical VOAs are generally wavelength dependent. Mechanical VOAs on the other hand provide or adjust the optical attenuation in a manner that is relatively independent of wavelength. However, mechanical VOAs are known to have a number of problems, including instability, backlash, etc. Mechanical VOAs are less reliable as they tend to have increased susceptibility to shock and vibration. As mechanical resonances are long on the time scale of the network traffic, large blocks (megabytes) of data can be affected while a mechanical VOA recovers from a shock or vibration. On the other hand, backlash denotes inaccuracy in optical signal attenuation setting when adjusting the mechanical VOA device.

Ideally, the VOA should produce a continuously variable optical signal attenuation while introducing a normal or suitable insertion loss and while exhibiting a desired optical return loss. If the VOA causes excessive reflectance back toward the transmitter, the transmitter may become less stable, undermining the effectiveness of the VOA connection. It is generally desired that a VOA can be produced in a cost effective manner. Similarly, it is also desirable that a VOA has a small foot print and a straight-forward control mechanism.

BRIEF DESCRIPTION OF THE DRAWINGS

The present patent is illustrated by way of examples and not limitations in the accompanying figures, in which like references indicate similar elements, and in which.

DETAILED DESCRIPTION OF THE EXAMPLES

Figure 1:
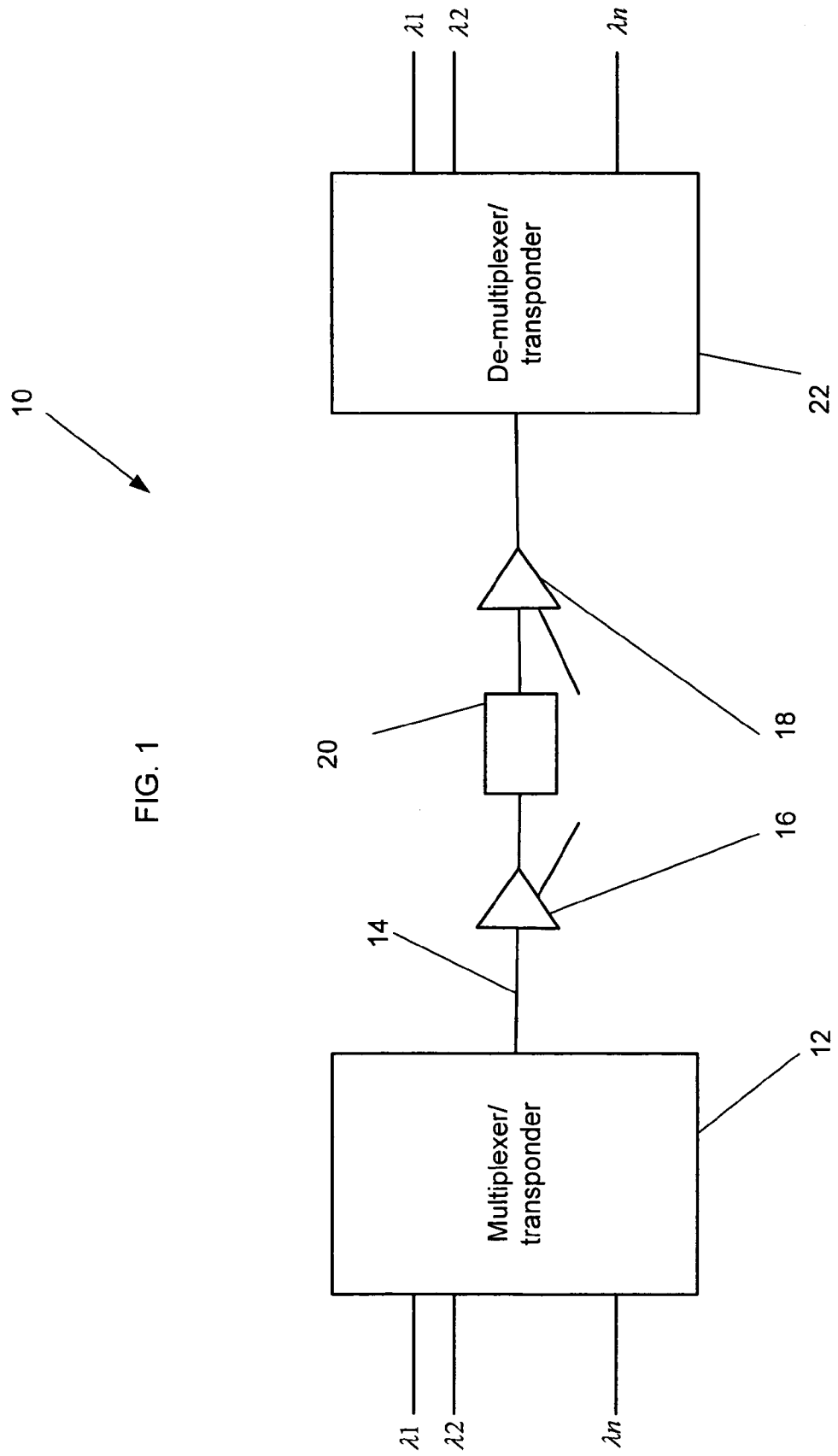
FIG. 1 illustrates an example optical fiber transmission system.

FIG. 1 illustrates an example optical fiber transmission system 10. The transmission system 10 comprises a multiplexer/transponder apparatus 12, a fiber optic cable 14, one or more optical amplifiers 16, 18, a variable optical attenuator (VOA) 20, and a de-multiplexer/transponder apparatus 22.

The multiplexer/transponder apparatus 12 may be a single apparatus that both multiplexes a number of signals into one output signal having a number of different wavelengths and transmits the multiplexed signal onto an optical fiber. Alternatively, the multiplexer/transponder apparatus 12 may be an assembly of a multiplexer and a transponder. The multiplexer/transponder apparatus 12 of FIG. 1 receives a number of input signals $\lambda 1, \ldots \lambda n$, and outputs a multiplexed optical signal onto the fiber optic cable 14.

The optical amplifiers 16, 18 may be any of the commonly used optical amplifiers. An example of commonly used optical amplifier in optical transmission systems using a commonly used transmission technique, known as wavelength division multiplexing (WDM), is erbium-doped fiber amplifier (EDFA). EDFAs are capable of simultaneously amplifying optical signals of many wavelengths. Use of EDFAs allows using WDM for optical transmission systems spanning very long distances.

The VOA 20 may be any of the commonly used VOAs such as a mechanical VOA, a magneto-optic VOA, a liquid crystal VOA, etc. The VOA 20 is designed to control signal power levels in the transmission system 10, typically to reduce the power level in the transmission system 10 to a desired set point. The VOA 20 may achieve a desired power reduction by diverting optic energy towards or away from a fiber optic medium. The VOA 20 may have desired coupling efficiency of anywhere from essentially zero to one hundred percent, depending upon the desired power reduction. Various implementations of the VOA 20 designed using a thermally gradient prism are illustrated in FIGS. 2–6.

The de-multiplexer/transponder apparatus 22 may be a single apparatus that both receives a multiplexed optical signal and de-multiplexes the multiplexed optical signal into a number of output signals. Alternatively, the de-multiplexer/transponder apparatus 22 may be an assembly of a de-multiplexer and a transponder. The de-multiplexer/transponder apparatus 22 of FIG. 1 receives a multiplexed optical signal from the optic cable 14 and de-multiplexes it into a number of output signals having wavelengths $\lambda 1 \ldots \lambda n$.

Figure 2:
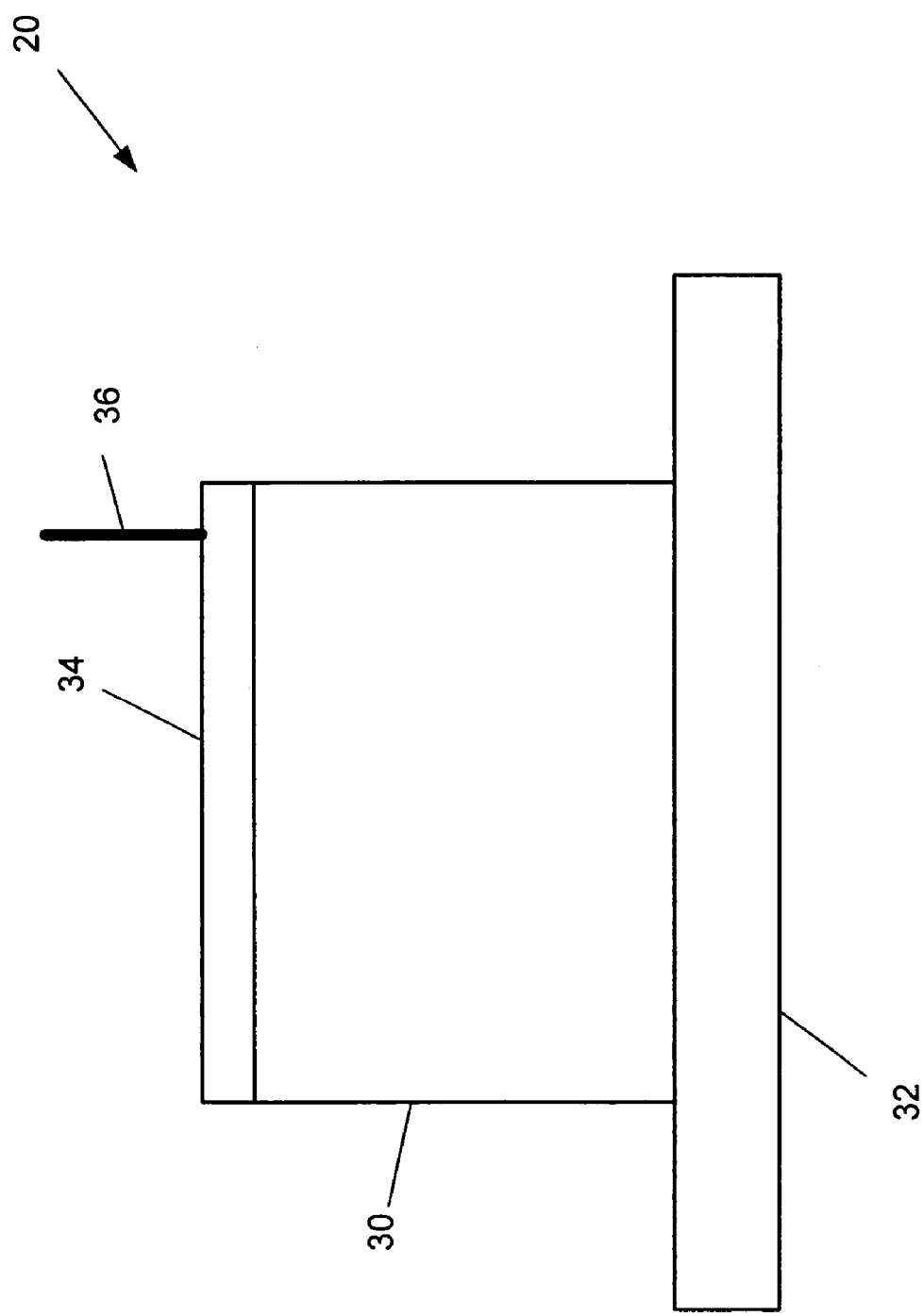
FIG. 2 illustrates an implementation of a variable optical attenuator (VOA) used in the transmission system of FIG. 1, where the VOA uses a thermal gradient prism.

FIG. 2 illustrates an implementation of a variable optical attenuator (VOA) 20 used in the transmission system 10. The VOA 20 comprises a thermal gradient prism 30, a substrate 32, and a heating element 34. The prism 30 may be made of any of the commonly used material that is capable of transmitting optical signal through it and that preferably has low thermal conductivity and high temperature dispersion. Examples of materials that may be used for the prism 30 include, but are not limited to, (1) silicon, (2) sapphire, (3) CaF2, (4) bk7, (5) f2, (6) krs-5 and (7) GASIR. Various properties of materials that may be used in the prism 30 are discussed in more detail below.

The substrate 32 may be made of any materials such as silicon, barium titanate, magnesium oxide, aluminum nitride, beryllium oxide, steel, etc., or a combination of some of these or other materials. An example of the heating element 34 may be a lithographed metal wire or deposited sheet resistor that is bonded to the prism 30. The heating element 34 may apply electric power to generate heat flow. For example, if the heating element 34 is copper, it may be attached to a source of electric energy via a conducting element 36. In an alternate implementation, the heating element 34 may be applied energy by laser, in which case it may not be necessary to have the conducting element 36 attached to the heating element 34.

Figure 3:
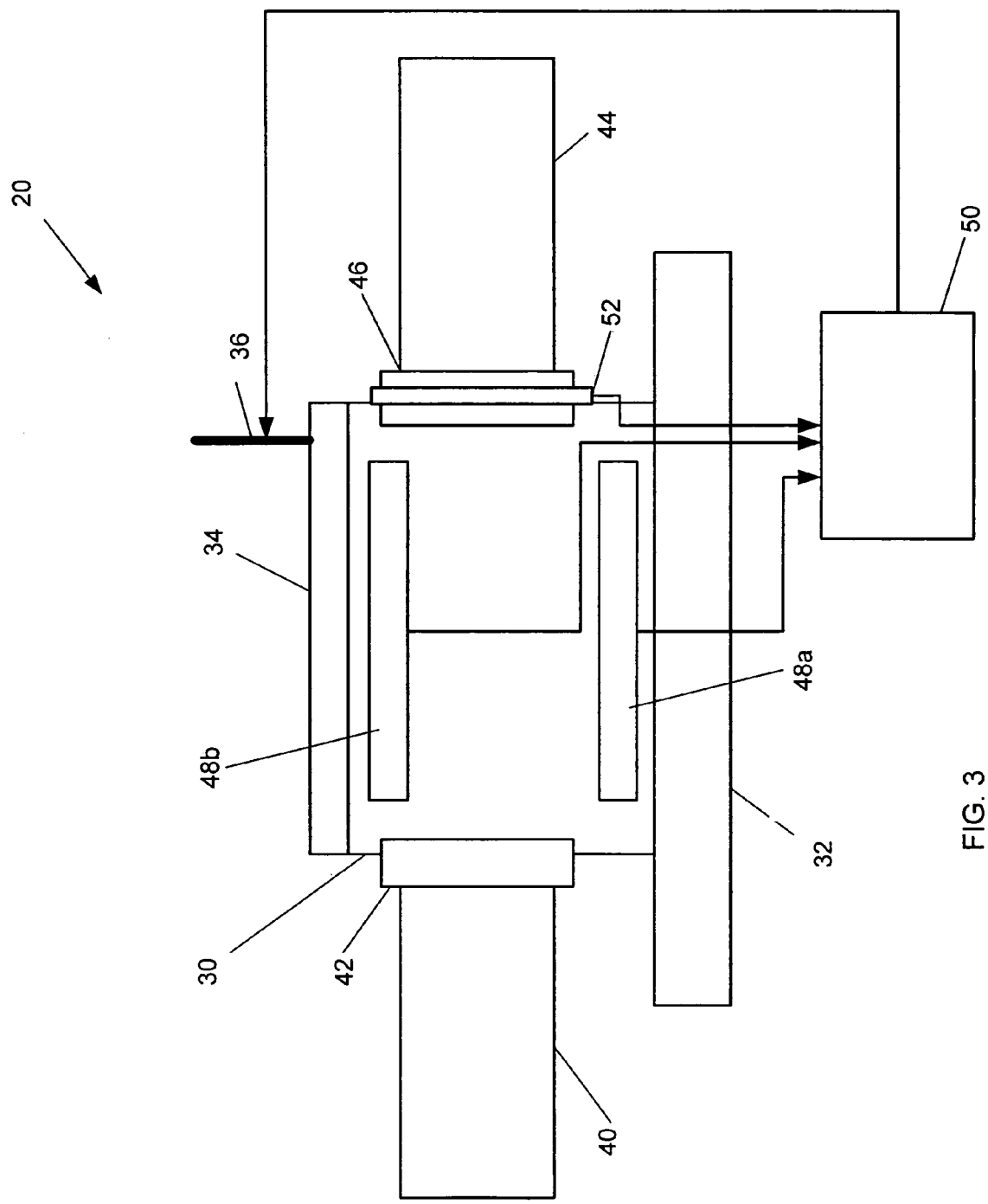
FIG. 3 illustrates an example operating configuration of the VOA illustrated in FIG. 2.

FIG. 3 illustrates an example operating configuration of the VOA 20. In FIG. 3, the VOA 20 is connected to an optical signal input source 40 via an input coupling lens 42 and an optical signal output source 44 via an output coupling lens 46. Also shown in FIG. 3 are a temperature detection apparatus 48, which is coupled to the prism 30 and to a processing apparatus 50, and an optical strength measuring apparatus 52, which is coupled to the output coupling lens 46, and to the processing apparatus 50.

The optical signal input source 40 may be an optical fiber, an optical amplifier, a waveguide, a laser diode, etc., that generates or transmits an optical signal. The optical signal from the optical signal input source 40 is coupled to the VOA 20 via the input coupling lens 42. An example of the input coupling lens 42 may be a collimating lens such as a plano convex, a plano asphere, a GRIN, or a ball lens, etc. While it is not necessary that the input coupling lens 42 provide collimation, it is beneficial to have the input coupling lens 42 of a type that generally does not cause a significant amount of optical aberration. However, any of the generally available coupling lenses that allow coupling an optical signal carrying medium to a VOA may be used as the input coupling lens 42.

Similarly, the optical signal output source may be an optical fiber, an optical amplifier, a waveguide, etc., that can transmit or process an optical signal. The output coupling lens 46 may be similar to the input coupling lens 42, or any other coupling lens used to connect a VOA to an optical signal carrying medium.

The temperature detection apparatus 48 may be any of the commonly used apparatus that can measure temperature of the VOA 20 and transmit temperature information to a processing apparatus 50. For example, the temperature detection apparatus 48 may be a resistance temperature detector (RTD). The temperature detection apparatus 48 shown in FIG. 3 comprises two RTD elements located on the surface of the prism 30. The first RTD element 48a is located near or on the top of the prism 30 while the second RTD element 48b is located near or on the bottom of the prism 30. The functioning of the temperature detection apparatus 48 is well known to those of ordinary skill in the art. The output of the temperature detection apparatus 48 is input into the processing apparatus 50. The functioning of the processing apparatus 50 is described in further detail in FIG. 4.

The optical strength measuring apparatus 52 measures the strength of the optical signal output into the optical signal output source 44. There are various methods available for measuring the strength of the optical signal output into the optical signal output source 44. The strength of the optical signal input into the optical signal output source 44 may be represented by the angle at which the optical signal output from the prism 30 approaches the output coupling lens 46. Therefore, in the implementation illustrated in FIG. 3, the optical strength measuring apparatus 52 measures the angle of the optical signal output from the prism 30 to estimate the strength of the optical signal input into the optical signal output source 44. However, in an alternate implementation, other method of measuring the strength of the optical signal output into the optical signal output source 44 may be employed. The optical strength measuring apparatus 52 provides measurement of the strength of the optical signal output into the optical signal output source 44 to the processing apparatus 50.

The processing apparatus 50 may be a computer or an equivalent device. In the implementation shown in FIG. 3, the processing apparatus is a computer having, among other components, a processor, an input device, an output device and a memory. The processing apparatus 50 receives inputs from the temperature detection apparatus 48 and the optical strength measuring apparatus 52, processes these inputs according to a program stored on the memory and provides output signal to the heating element 34. An example of the program stored on the memory of the processing apparatus is shown in FIG. 4.

Figure 4:
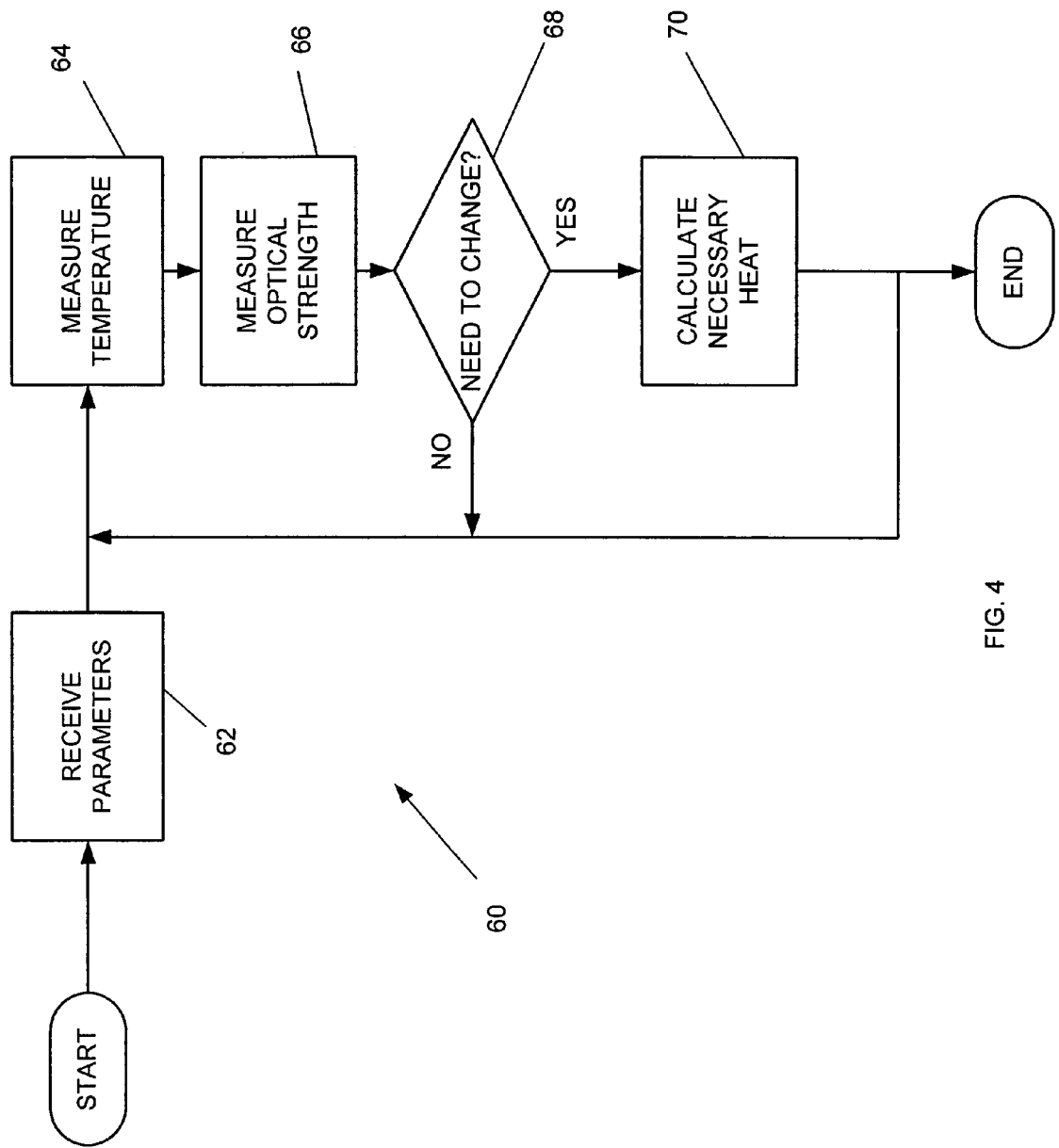
FIG. 4 illustrates an example flowchart of a program designed to perform optical signal attenuation using the VOA illustrated in FIG. 2.

FIG. 4 illustrates an example flowchart of a program 60 designed to perform optical signal attenuation operation using the VOA 20. The program 60 may be stored in the memory of the processing apparatus 50 and executed on the processor of the processing apparatus 50. At a block 62 the program 60 receives parameters regarding the VOA 20 and desired attenuation of an optical signal traveling through the VOA 20. A user can specify various parameters of the VOA 20 such as figure of merit (FOM), index of refraction, and coefficient of thermal expansion (CTE) of the material comprising the prism 30, the width of the prism 30, the length of the path of an optical signal traveling through the prism 30, the wavelength of the optical signal traveling through the prism 30, etc. A user can also specify various parameters related to a desired coupling efficiency of the VOA 20, a desired angle of an optical signal emerging from the VOA 20, a desired strength of an optical signal emerging from the VOA 20, etc. As described below, the information specified by the user at the block 62 along with various measurements provided to the processing apparatus 50 by the temperature detection apparatus 48 and by the optical strength measuring apparatus 52 are used to control the attenuation function of the VOA 20.

At a block 64, the program 60 requests the temperature detection apparatus 48 to measure and provide measurements of the temperature of the prism 30 to the processing apparatus 50. Depending upon the structure of the temperature detection apparatus 48, it may provide one or more measurements of the temperature on the surface of the prism 30. For example, in one implementation, the temperature detection apparatus 48 may be detecting surface temperature of the prism 30 at two endpoints of the prism 30 and provide two temperature measurements to the processing apparatus 50. Other alternate embodiments of the temperature detection apparatus 48 are possible. Even though in the example illustrated in FIG. 4, the program 60 requests the temperature detection apparatus 48 to measure and provide measurements of the temperature of the prism 30, in an alternate embodiment, the temperature detection apparatus 48 may be providing temperature measurements to the programming apparatus 50 automatically at a predetermined periodic rate. The program 60 stores the temperature measurements provided to the processing apparatus 50 in the memory of the processing apparatus 50 for further processing.

At a block 66, the program 60 requests the optical strength measuring apparatus 52 to measure and provide measurements of the optical strength of the optical signal emerging from the prism 30. The optical strength measuring apparatus 52 may measure the strength of the optical signal emerging from the prism 30 using an angle of the optical signal emerging from the prism 30 or via an alternate measure representing the strength of the optical signal emerging from the prism 30. The program 60 stores the measurements of the optical strength of the optical signal emerging from the prism 30 in the memory of the processing apparatus 50 for further processing. It would be obvious to one of ordinary skill in the art that even though the program 60 is illustrated as collecting measurements of various parameters at various blocks, in reality, various measurements may be made simultaneously or in an alternate order. For example, in an alternate implementation of the program 60, various measurements may be provided to the processing apparatus 50 using program interrupts.

Subsequently, at a block 68, the program 60 determines if a change is required in the optical strength of the optical signal emerging from the prism 30. Such determination can be done by comparing the optical strength of the optical signal emerging from the prism 30 as measured by the optical strength measuring apparatus 52 with the specification for optical strength of the optical signal emerging from the prism 30, as provided by the user at the block 62. If it is determined that it is necessary to change the optical strength of the optical signal emerging from the prism 30, the control is transferred to a block 70, otherwise the program 60 continues the monitoring of various parameters at the block 64.

The block 70 determines any actions that may be necessary to effect the change in the optical strength of the optical signal emerging from the prism 30 so that the measured value of the optical strength of the optical signal emerging from the prism 30 is approximately equal to the specified value of the optical strength of the optical signal emerging from the prism 30. An example of such an action may be a change in the temperature gradient of the prism 30, which may be necessary to change the amount of deflection of an optical signal traveling through the prism 30. For example, to reduce the optical strength of the optical signal emerging from the prism 30, it may be necessary to increase the deflection of the optical signal traveling through the optical prism 30 away from the optical signal output source 44. To affect the higher level of deflection, the thermal gradient of the prism 30 may need to be increased by applying increased amount of heat to the prism 30 through the heating element 34.

The amount of energy that is needed to be applied to the heating element 34 to cause a desired amount of deflection of an optical signal traveling through the prism 30 can be determined using the FOM of the material of the prism 30, where the FOM is defined in units of resolvable spots per power.

Based on the actual angle of the optical signal emerging from the prism 30, the desired angle of the optical signal emerging from the prism 30, and the wavelength $\lambda$ of the optical signal traveling through the prism 30, the processing apparatus 50 can first determine number of resolvable spots N by which the optical signal traveling through the prism 30 needs to be deflected, and then using the number of the resolvable spots N, the processing apparatus can determine the power necessary to be applied to the heating element 34 by using the FOM of the prism 30.

Once the processing apparatus 50 determines the amount of energy that is needed to be applied through the heating element 34, at a block 72, the processing apparatus 50 sends a signal to the heating element 34 so that the heating element 34 applies a specified amount of energy to the prism 30. It would be obvious to one of ordinary skill in the art that if it is necessary to reduce the amount of deflection of an optical signal emerging from the prism 30, the processing apparatus 50 may direct the heating element 34 to reduce the amount of heat energy applied to the prism 30. Subsequently, the program 60 resumes monitoring various parameters at the block 64.

Figure 5:
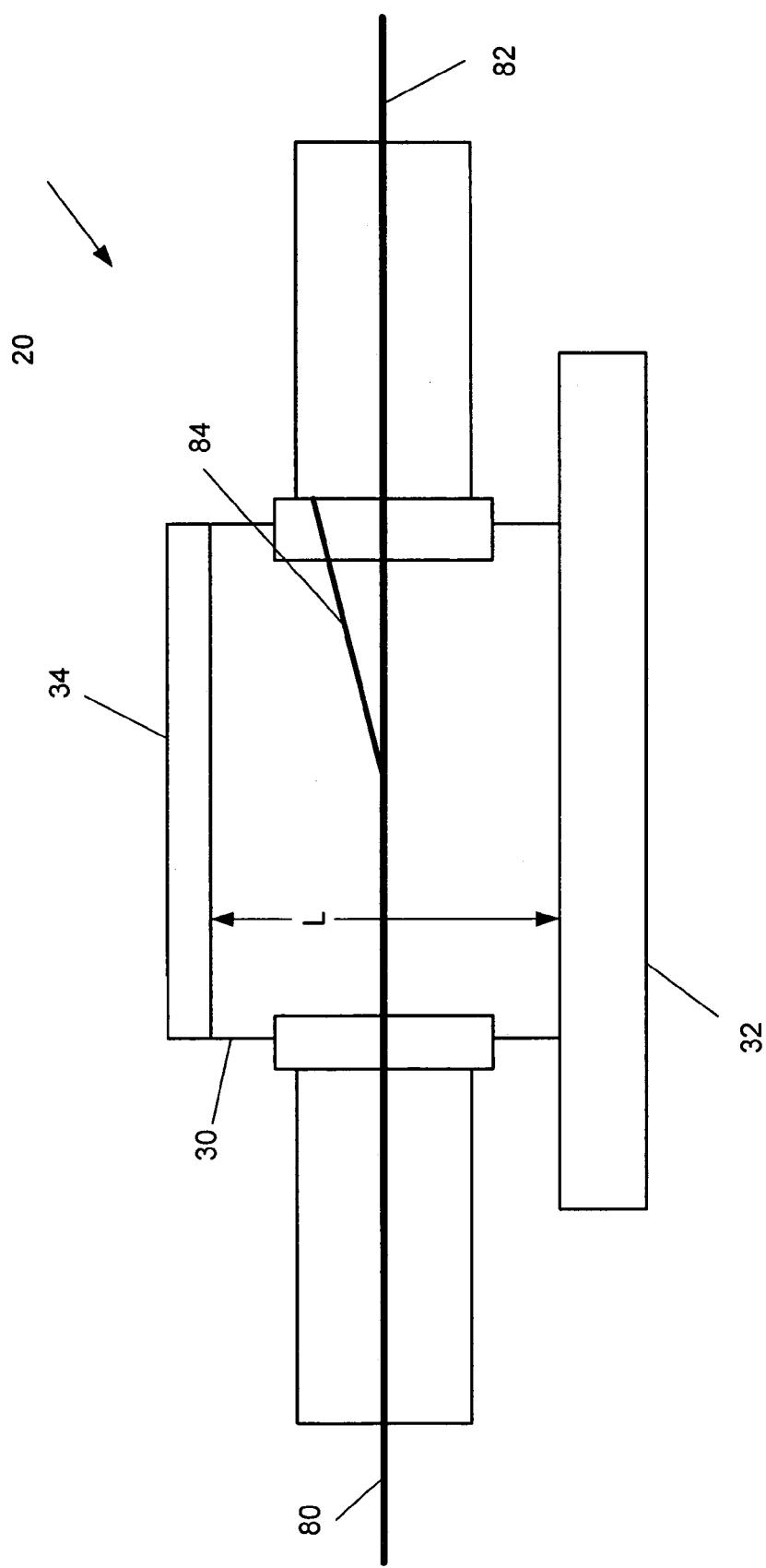
FIG. 5 illustrates a path of an optical signal through the VOA illustrated in FIG. 2 as a result of an optical signal attenuation performed according to the flowchart illustrated in FIG. 4.

FIG. 5 illustrates a path of an optical input signal 80 through the prism 30 as a result of the attenuation operation performed according to the flowchart 60 of FIG. 4. (It is assumed that the prism 30 illustrated in FIG. 5 comprises of a material having a negative FOM, such as krs-5). A line 82 illustrates the path of an optical output signal emerging from the prism 30 when there is no heat applied to the prism 30, i.e, in the absence of a thermal gradient in the prism 30. A line 84 illustrates the path of an optical output signal emerging from the prism 30 when heat is applied to the prism 30 via the heating element 34. Application of heat causes the prism 30 to have a thermal gradient across its width L. As a result, the optical input signal 80 is deflected upwards as it traverses through the prism 30.

In a special case of the attenuation operation of the VOA 20, the amount of heat applied to the prism 30 is such as to cause the optical input signal 80 to be nearly completely deflected away from the optical signal output source 44. In this case where nearly all of the optical signal input signal 80 is deflected away from the optical signal output source 44, causing the optical signal output into the optical signal output source 44 to be almost zero, the VOA 20 is said to operate as a shutter, meaning that essentially no optical energy in output from the VOA 20.

The FOM of various materials that may be used to make the prism 30, for an optical signal of wavelength λ equal to 1.55E-06 meters is provided below in table I.

TABLE I

| Material | FOM (spots/Watts) | 1/FOM (mWatts/spots) |
|---|---|---|
| silicon | 0.72 | 1380.2 |
| sapphire | 0.39 | 2587.5 |
| CaF2 | −0.22 | −4633.1 |
| bk7 | 3.39 | 295.2 |
| f2 | 5.99 | 167.0 |
| krs-5 | −181.71 | −5.5 |
| GASIR | 186.66 | 5.4 |

As can be seen from the Table I, krs-5 has a negative FOM, while GASIR has a positive FOM. The upward deflection of the optical input signal 80 as depicted in FIG. 5 is effected when the prism 30 is made of a material having a negative FOM. On the other hand, if the prism 30 was made of a material having a positive FOM, the deflection of the optical input signal 80 will be in the opposite direction, i.e., upwards, in the implementation illustrated in FIG. 5. Thus variations in the FOM of various materials can be utilized to effect a very fine deflection control of an optical input signal as it passed through a thermal gradient prism. An alternate implementation of a VOA with a dual thermal gradient prism 100 comprising two different materials having FOM of opposite signs is illustrated in FIG. 6 and explained in further detail below.

Figure 6:
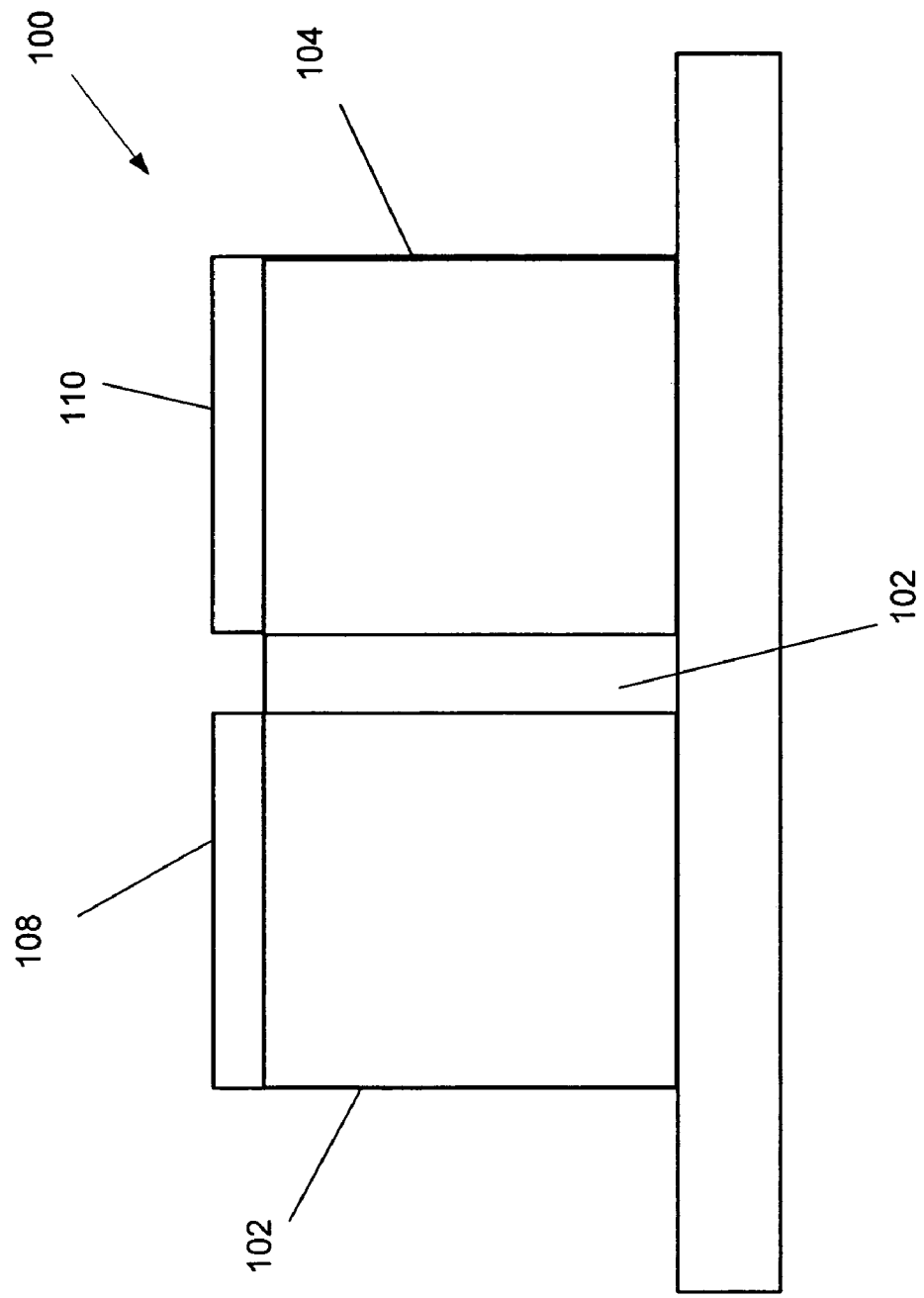
FIG. 6 illustrates an alternate implementation of the VOA illustrated in FIG. 2.

The dual thermal gradient prism 100 illustrated in FIG. 6 has a first thermal gradient section 102 made of a material having a positive FOM and a second thermal gradient section 104 having a negative FOM. The area 106 between the first thermal gradient section 102 and the second thermal gradient section 104 is thermally nonconductive, e.g., air. A first heating element 108 is attached to the first thermal gradient section 102, and a second heating element 110 is attached to the second thermal gradient section 104. In light of the description of the operation of the thermal gradient prism 30 in FIGS. 2–5 above, the operation of the dual thermal gradient prism 100 will be obvious to one of ordinary skill in the art. The dual thermal gradient prism 100 may also be used in a transmission system where one can expect an upward bias to optical beam steering over lifetime. In such as case, it is useful to have a section of the dual thermal gradient prism 100 made of a material having positive FOM, for example GASIR, that reduces an optical path length for an increase in the temperature and causes a downward beam steering for increased temperature on the top of the dual thermal gradient prism 100. Thus the dual thermal gradient prism 100 can be used to compensate for lifetime drift in optical transmission systems.

The dual thermal gradient prism 100 may also be constructed to be passively stabilized with respect to change in ambient temperature gradient perpendicular to the path of an optical beam traveling through the dual thermal gradient prism 100. Such passively stabilized dual thermal gradient prism arrangement requires the FOM of the first thermal gradient section 102 and the FOM of the second thermal gradient section 104 to be opposite to each other, and the length of the first thermal gradient section 102 and the length of the second thermal gradient section 104 to be such that a deflection of an optical beam traveling through the first thermal gradient section 102 for a given change in the ambient temperature gradient perpendicular to the path of an optical beam traveling through the dual thermal gradient prism 100 is equal and opposite to the deflection of the optical beam in the second thermal gradient section 104. This passively stabilized arrangement of the dual thermal gradient prism 100 allows reducing effect of environmental disturbances on performance of the dual thermal gradient prism 100 and thus reducing requirement for rejection of environmental disturbances by active servo arrangement.

Although the forgoing text sets forth a detailed description of numerous different embodiments, it should be understood that the scope of this disclosure is defined by the words of the claims set forth at the end of this patent. The detailed description is to be construed as example only and does not describe every possible embodiment, because describing every possible embodiment would be impractical, if not impossible. Numerous alternative embodiments could be implemented, using either current technology or technology developed after the filing date of this patent, which would still fall within the scope of the claims of this patent.

Thus, many modifications and variations may be made in the techniques and structures described and illustrated herein without departing from the spirit and scope of this disclosure specifically. Accordingly, it should be understood that the methods and apparatus described herein are illustrative only and are not limiting upon the scope of this patent.

What is claimed is:

1. A method of controlling attenuation of an optical signal in a optical network, the method comprising:

applying energy to a first heating element coupled to a first thermal gradient prism, wherein the first thermal gradient prism is made of a first thermally active medium;

applying energy to a second heating element coupled to a second thermal gradient prism, wherein the second thermal gradient prism is made of a second thermally active medium;

inputting the optical signal into the first thermal gradient prism;

inputting the optical signal output from the first thermal gradient prism into the second thermal gradient prism;

measuring strength of the optical signal output from the second thermal gradient prism;

adjusting level of energy applied to the first heating element in response to the strength of the optical signal output from the second thermal gradient prism; and adjusting level of energy applied to the second heating element in response to the strength of the optical signal output from the second thermal gradient prism.

2. The method of claim 1, wherein one of the first thermally active material and the second thermally active material has a positive figure of merit and the other of the first thermally active material and the second thermally active material has a negative figure of merit.

3. The method of claim 1, wherein the first thermally active material is KRS-5 and the second thermally active material is Gasir.

4. The method of claim 1, further comprising:

measuring a first environmental temperature surrounding the first thermal gradient prism;

measuring a second environmental temperature surrounding the second thermal gradient prism;

adjusting the level of energy applied to the first heating element based on the first environmental temperature; and adjusting the level of energy applied to the second heating element based on the second environmental temperature.

5. The method of claim 1, wherein the level of energy applied to the first heating element and the level of energy applied to the second element is such that the strength of the optical signal output from the second thermal gradient prism is approximately close to zero.

6. The method of claim 1, wherein the first thermal gradient prism and the second thermal gradient prism are separated by a thermally non-conductive material.

7. The method of claim 1, wherein measuring the strength of the optical signal output from the second thermal gradient prism comprises measuring angle of the optical signal output from the second thermal gradient prism.

* * * * *